Figures 1, 8:
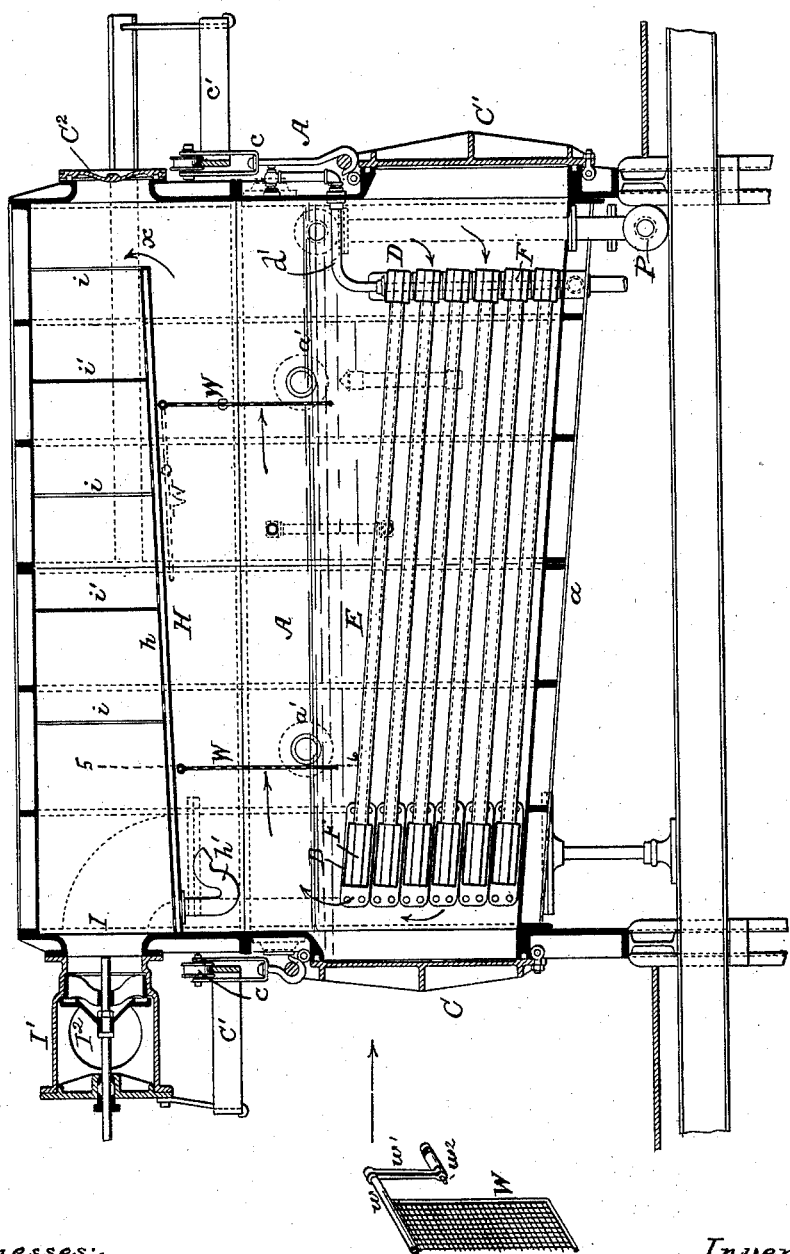

(No Model.) 5 Sheets—Sheet 1.

G. M. NEWHALL & T. H. MÜLLER.
EVAPORATOR.

No. 477,442. Patented June 21, 1892.

Witnesses:
Fred D. Goodwin
A. V. Groupe

Inventors:
George M. Newhall
Teile H. Müller
by their Attorneys
Howson & Howson

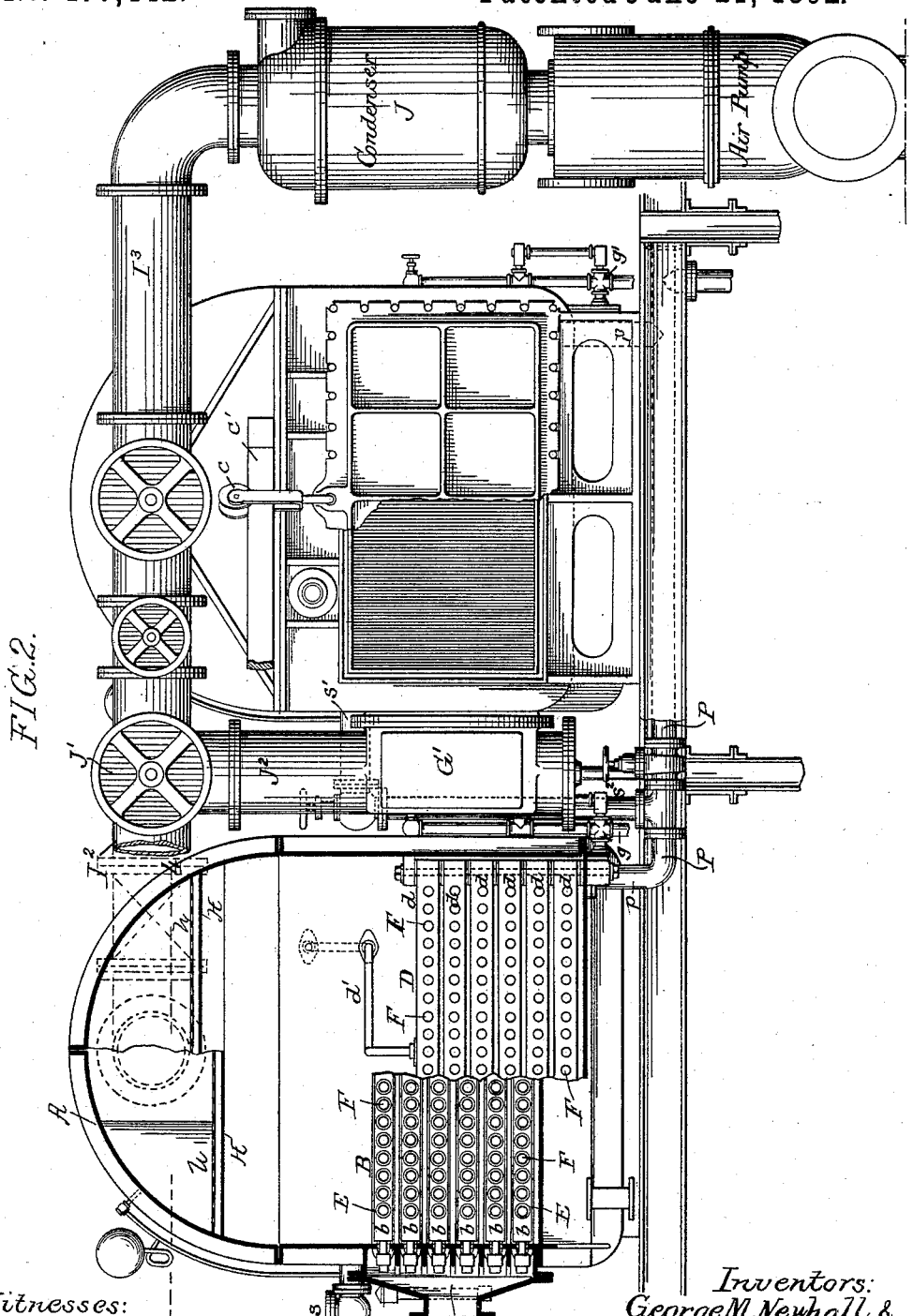

(No Model.) 5 Sheets—Sheet 3.
G. M. NEWHALL & T. H. MÜLLER.
EVAPORATOR.
No. 477,442. Patented June 21, 1892.
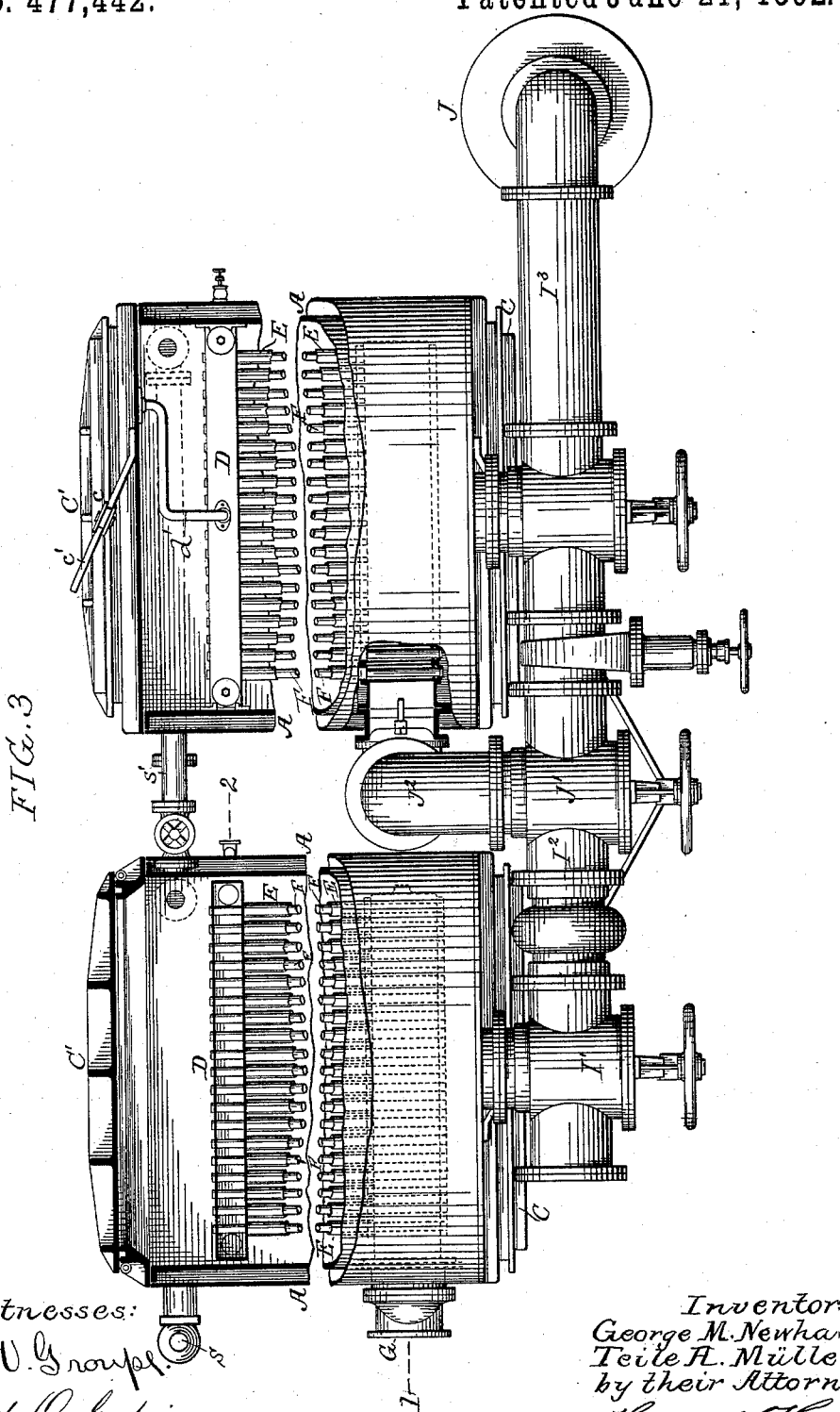
Witnesses:
A. V. Groupé
Fred D. Goodwin
Inventors:
George M. Newhall &
Teile H. Müller
by their Attorneys
Howson & Howson (No Model.) 5 Sheets—Sheet 4.
G. M. NEWHALL & T. H. MÜLLER.
EVAPORATOR.
No. 477,442. Patented June 21, 1892.
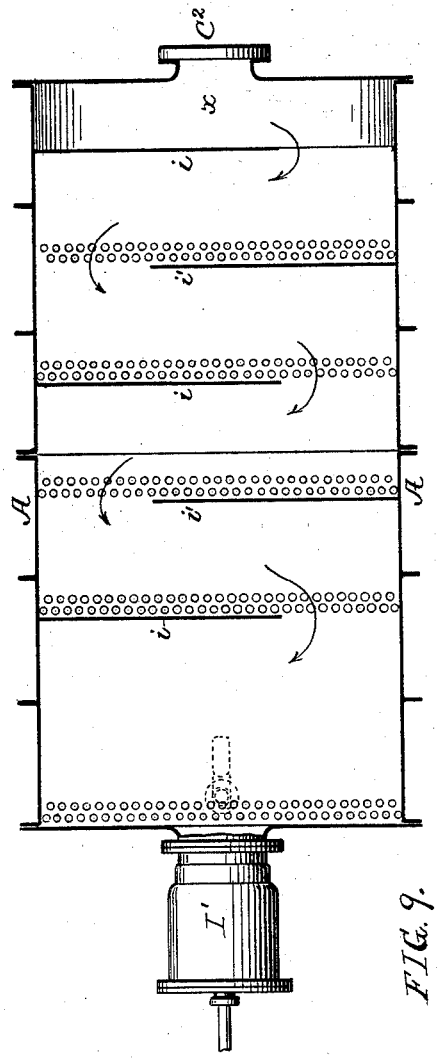
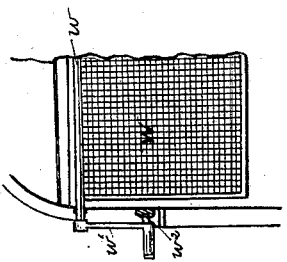
Witnesses:
A. V. Groupe
Fred L. Goodwin
Inventors:
George M. Newhall &
Teile H. Müller
by his Attorneys
Howson & Howson (No Model.) 5 Sheets—Sheet 5.
G. M. NEWHALL & T. H. MÜLLER.
EVAPORATOR.
No. 477,442. Patented June 21, 1892.
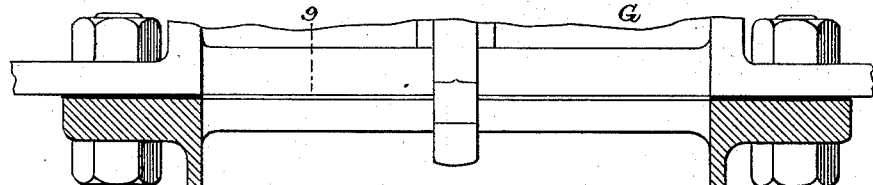
FIG. 7.
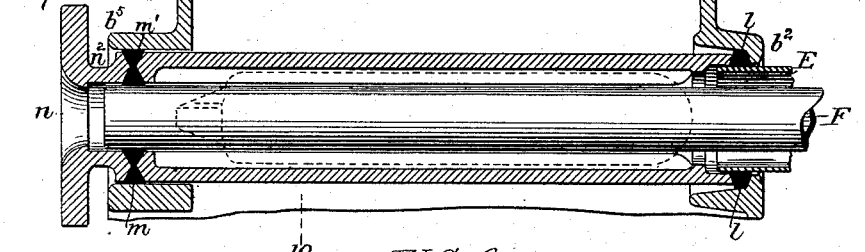
FIG. 6.
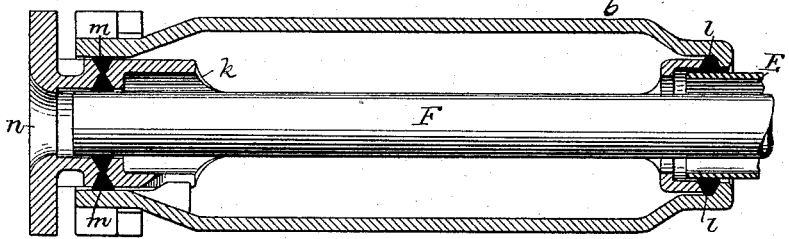
FIG. 4ᵃ
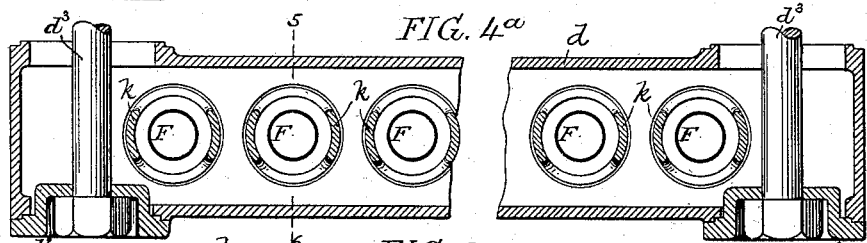
FIG. 5.
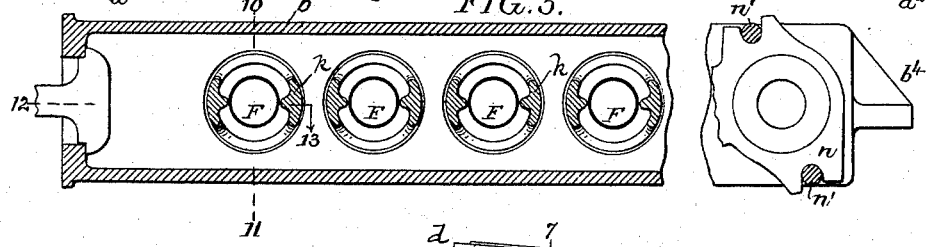
FIG. 4.
Witnesses:
Fred D. Goodwin
Alex. Barkoff
Inventors:
Geo. M. Newhall &
Teile H. Müller
by their Attorneys

UNITED STATES PATENT OFFICE.

GEORGE M. NEWHALL AND TEILE H. MÜLLER, OF PHILADELPHIA, PENNSYLVANIA, ASSIGNORS TO THE GEORGE M. NEWHALL ENGINEERING COMPANY, LIMITED, OF SAME PLACE.

EVAPORATOR.

SPECIFICATION forming part of Letters Patent No. 477,442, dated June 21, 1892.

Application filed February 16, 1891. Serial No. 381,600. (No model.)

*To all whom it may concern:*

Be it known that we, GEORGE M. NEWHALL and TEILE H. MÜLLER, citizens of the United States, and residents of Philadelphia, Pennsylvania, have invented certain Improvements in Evaporators, of which the following is a specification.

The object of our invention is to provide more efficient heating-surfaces for evaporating-vessels, and at the same time so arranging the parts that they can be readily cleaned or repaired, as fully described hereinafter.

The apparatus shown in the accompanying drawings is what is known as a "multiple-effect" evaporator, in which two or more evaporating-vessels are arranged in series, as well understood by those familiar with the subject. In describing the invention hereinafter we will refer to a single evaporator.

In the accompanying drawings, Figure 1 is a longitudinal sectional view of our improved evaporator. Fig. 2 is a view looking in the direction of the arrow, Fig. 1, one of the evaporators being in section on the line 1 2, Fig. 3. Fig. 3 is a plan view, partly in section. Fig. $3^a$ is a sectional plan on the line 3 4, Fig. 2. Fig. 4 is a transverse section on the line 5 6, Fig. $4^a$, of one of the headers. Fig. $4^a$ is a sectional view of the same, on a smaller scale, on the line 7 8, Fig. 4. Fig. 5 is a sectional view on the line 9 10, Fig. 7, of the opposite header. Fig. 6 is a sectional view of the same, on the line 10 11, Fig. 5, on a larger scale. Fig. 7 is a sectional plan view on the line 12 13, Fig. 5. Fig. 8 is a perspective view of one of the transverse screens; and Fig. 9 is a sectional view of a portion of the evaporator on the line 5 6, Fig. 1.

Referring to Figs. 1, 2, and 3, A is the casing of the evaporator, mounted on suitable supports. The bottom $a$ of the casing is inclined, as shown in Fig. 1, in order to provide for the flow of liquid to the outlet. B and D are a series of headers, B being the inlet-headers, and D the headers connected to the air-outlet. Connecting these two headers are the pipes E and F, the pipe F being smaller than the pipe E and fitting therein, so as to form a passage between the pipes for the flow of steam of other hot vapor. The peculiar construction of these headers will be described hereinafter on reference to Figs. 4 to 7; but we would say here that the header B is so constructed that the tube or pipe F extends through the header and is open to receive the liquid to be evaporated. It also extends through the header D for the same purpose, so that the circulation of liquid will be, as indicated by the arrows, Fig. 1, not only around the tubes E, but also through the tubes F, so that a double heating-surface is provided, as will be readily understood on referring to Figs. 3 and 6.

At each end of the evaporating-vessel A are doors C C', which are hung to trolleys $c$, adapted to rails $c'$, secured in any suitable manner to the frame-work of the apparatus, so that by simply unbolting these doors they can be moved away from the openings, allowing for the ready removal of any one or all of the tubes or the headers.

The header B, as will be noticed in Fig. 2, is composed of a series of sections $b$, which are coupled to a manifold G, connected to the steam-pipe in any suitable manner. The opposite header D is in the same manner made up of sections $d$, secured together and to the casing by bolts.

$d'$ is the air-outlet from the header D to allow for the escape of air that may gain access to the headers and the space between the tubes E and F.

$a'$ are a series of eyeglasses for the inspection of the contents of the evaporator.

In the upper portion of the evaporator is what is termed the "catchall." This catchall is arranged so as to free the steam arising from the liquid of solid impurities by making the steam pass to the outlet through a circuitous passage.

H is the bottom plate of the catchall, extending across the upper portion of the casing A, but not quite to the one end, leaving a space $x$. Above this plate H is a perforated plate $h$. These two plates are inclined, so as to carry the solid portions that are separated in the passage of the steam through the catchall to the outlet-pipe $h'$. This outlet-pipe is trapped, as shown, so as to prevent the passage of steam through the pipe to the outlet without passing through the catchall. The pipe $h'$ discharges again into the evaporator, or may discharge to waste.

A series of transverse partitions $i$ $i'$ extend partially across the evaporator, Fig. 3ª. The partition $i$ stops short at one side, and the partition $i'$ stops short on the opposite side, thus forming a circuitous passage for the steam, and as it is forced against these partitions the heavy particles collect by impact on the partitions and fall by gravity and pass through the bottom plate $h$, from which they fall to the outlet-pipe $h'$, while the pure steam passes through the steam-outlet I, which is provided with a suitable valve $I'$ into a passage $I^2$, from which it can be directed at once to the condenser J, or directed to the second evaporator to heat the water therein when the evaporators are used as multiple-effect evaporators.

$C^2$ is a manhole opening at the upper end of the evaporator opposite to the steam-outlet I.

The evaporator is provided with the usual vacuum-gage, liquor-tester, liquor-glass, and water-gage common to evaporators.

Referring to Figs. 5, 6, and 7, which represent views of one of the sections $b$ of the header B, each of the sections $b$ is in the form of an elongated chamber closed at its outer end and provided at that point with a toe $b^4$, which rests upon a suitable fixed support in the chamber, the opposite end of each section being connected to the manifold G. The front face $b'$ of each section is provided with a series of annular flanges $b^2$, within which fit the ends of the outer tubes E. The rear face $b^3$ of each section is provided with a series of annular flanges $b^5$, and between these flanges and a packing-ring $l$ on the inner face of the flanges $b^2$ are open-ribbed collars $k$, as shown more clearly in Fig. 5, the steam from the manifold passing through the opening in the collars and out through the tubes E. The rear end of each collar is reduced in diameter, and in this reduced portion is fitted the end of the tube F, which extends through the collar and through the tube E to the opposite header D. At the rear end of each of the sections $b$ is a follower $n$, which may be made of a single piece extending the full length of each section and provided with a series of projecting follower-rings $n^2$, one for each of the tubes F, and between this follower-ring and the rear end of the collar $k$ is a packing-ring $m$, so that when the follower is forced up into position by its bolts $n'$, Fig. 5, it will first compress the packing $m$, and then, acting on the collar $k$, will compress the packing $l$, and by this single movement effect the simultaneous packing of both the tubes E and F. The header D is made up of a series of sections $d$, which differ from the sections of the header B in that they communicate with each other, as illustrated in Fig. 4ª, which is a sectional view of the lowest section of the series and is provided with a cup $d^2$ at each end, in which are the heads of the bolts $d^3$, connecting the series of sections together. In all other respects the construction of this header and the method of packing the tubes E and F are the same as that previously described with reference to the header B. By this method of packing and securing the tubes in position the tubes are free to expand longitudinally without in any way affecting the packing between the tubes and the headers.

As noted above, the evaporated liquid passes through the tube $I'$ either direct to the condenser through the tube $I^3$, or by shifting the valve $J'$ it can be directed down through the pipe $J^2$ to the inlet-opening $G'$ to the second evaporator, passing into the tubes of said evaporator and there condensing, passing out the pipe $g'$ without passing through the condenser $J'$. The water of condensation from the steam in the first vessel passes to waste through the pipe $g$, as shown in Fig. 2.

The bottom of each evaporator is connected to a waste-pipe P by a connection $p$ to carry off the residue and the liquid not condensed and for washing purposes. Referring to Fig. 2, $s$ is the liquid-inlet to the first evaporator, and $s'$ is the liquid-inlet to the second evaporator. This second inlet is in the present instance so arranged as to connect through the pipe $s^2$ with the pipe P, so that the liquid can pass from the first evaporator through the passage $p$ up to the pipe $s^2$ to the inlet $s'$ of the second evaporator, or liquid may be introduced directly into the evaporator without passing through the first evaporator.

We will use in the claims the term "steam-boxes" to designate the headers and their connecting-pipes.

In some instances, as shown in Fig. 1, we place across the evaporator a screen or screens W, preferably so hung as to extend below the liquor level. These screens are also preferably hinged, the pintle $w$ extending through the casing and provided with a handle $w'$, as shown in Fig. 8. This handle has a catch $w^2$, which engages with a notch or notches, as shown in Figs. 8 and 9, so that the screens can be raised to allow for the thorough cleansing of the interior of the evaporator and also to allow ready access for repairs. By placing these screens in the evaporator the froth or foam which forms on the surface of the liquid will be broken up and will not be carried to the catchall.

We claim as our invention—

1. The combination, in an evaporator, of the casing, the submerged steam-boxes comprising opposite headers B and D, the headers B being formed of sections, each communicating separately with the manifold inlet, and the headers D being formed of sections communicating with each other, with a series of concentric tubes extending between said headers, substantially as specified.

2. The combination, in an evaporator, of the casing, the header B, composed of a series of sections, each communicating separately with a manifold inlet G, the manifold inlet G, the header D at the opposite end of the casing, said header D comprising a series of connected and communicating sections $d$, tubes E, extending between the adjacent faces of the headers B and D and communicating therewith, and tubes F, situated within the tubes E and extending from the outer face of one header to the outer face of the opposite header, substantially as specified.

3. The combination of the header B, having front and rear faces, the tubes E and F, connected to said header, the tube F, terminating at the rear wall of the header, packing-rings surrounding the tubes E and F, a sleeve extending between said packing-rings, and a follower so arranged as to compress the two packing-rings simultaneously, substantially as specified.

4. A sectional steam-box for evaporators, having, in combination, a series of disconnected sections $b$, comprising a header B, and each of said sections communicating separately with a manifold inlet, a manifold inlet, a series of connected and communicating sections $d$, comprising a header B, a series of tubes E, extending between and connected to the adjacent walls of a section $b$ and a section $d$, and a series of tubes F, situated within the tubes E and connected to the outer walls of the same sections $b$ and $d$, whereby a portion of the steam-box comprising a section $b$, a section $d$, and their connecting-tubes E and F may be added or removed, substantially as specified.

5. The combination, with the evaporator, of the transverse plate H, arranged in the upper portion of the casing, the perforated plate above said plate H, and vertical deflecting-plates $ii'$, arranged substantially as described, so as to form a tortuous passage for the vapor, with an outlet therefor, substantially as described.

6. The combination, in an evaporator, of the casing, the transverse plate H, inclined toward one end, the perforated plate above said plate H, a trapped outlet from said catch-all, and vertical plates arranged substantially as described, forming a tortuous passage for the vapor in its passage to the vapor-outlet, substantially as and for the purpose described.

7. The combination, in an evaporator, of the casing, with screens extending transversely across the path of the escaping vapor, said screens being hinged to the casing and capable of being swung out of the way during cleaning or repairs, substantially as specified.

8. The combination, in an evaporator, of the casing, the screens extending transversely across the path of the escaping vapor, said screens being hinged to the casing, with an operating-handle and a retaining-bolt whereby the screens may be held either in or out of operative position.

In testimony whereof we have signed our names to this specification in the presence of two subscribing witnesses.

GEORGE M. NEWHALL.
TEILE H. MÜLLER.

Witnesses:
JNO. E. PARKER,
EUGENE ELTERICH.